US008870577B2

(12) United States Patent
Arakawa

(10) Patent No.: US 8,870,577 B2
(45) Date of Patent: Oct. 28, 2014

(54) ROTARY CONNECTOR DEVICE

(71) Applicant: Hayato Arakawa, Shiga (JP)

(72) Inventor: Hayato Arakawa, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 46 days.

(21) Appl. No.: 13/632,756

(22) Filed: Oct. 1, 2012

(65) Prior Publication Data
US 2013/0095671 A1 Apr. 18, 2013

Related U.S. Application Data

(63) Continuation of application No. PCT/JP2011/057343, filed on Mar. 25, 2011.

(30) Foreign Application Priority Data

Mar. 30, 2010 (JP) .................................. 2010/078596

(51) Int. Cl.
*H01R 39/00* (2006.01)
*B60R 16/027* (2006.01)
*H01R 35/02* (2006.01)

(52) U.S. Cl.
CPC .............. *H01R 39/00* (2013.01); *B60R 16/027* (2013.01); *H01R 35/025* (2013.01)
USPC ......................................... 439/15; 73/862.08

(58) Field of Classification Search
USPC ............. 73/118.1, 862.08, 862.041, 862.042; 439/15
See application file for complete search history.

(56) References Cited

U.S. PATENT DOCUMENTS

| 6,147,416 | A  | * | 11/2000 | Mitsuzuka | 307/10.1 |
| 6,271,515 | B1 | * | 8/2001 | Matsumoto | 250/239 |
| 6,282,968 | B1 | * | 9/2001 | Sano et al. | 73/862.08 |
| 6,983,647 | B2 | * | 1/2006 | Nagaoka et al. | 73/117.02 |
| 7,798,816 | B2 | * | 9/2010 | Oishi | 439/15 |
| 2005/0022617 | A1 | * | 2/2005 | Sano | 73/865.9 |
| 2005/0109089 | A1 | * | 5/2005 | Nagaoka et al. | 73/118.1 |
| 2009/0317994 | A1 | * | 12/2009 | Oishi | 439/164 |
| 2013/0095671 | A1 | * | 4/2013 | Arakawa | 439/15 |
| 2013/0095672 | A1 | * | 4/2013 | Hirai | 439/15 |
| 2013/0248220 | A1 | * | 9/2013 | Arakawa | 174/79 |

FOREIGN PATENT DOCUMENTS

| JP | 09-326282 A | 12/1997 |
| JP | 2000-003640 A | 1/2000 |
| JP | 2000-211440 A | 8/2000 |

OTHER PUBLICATIONS

International Search Report issued in PCT/JP2011/057343, mailed Apr. 26, 2011, 2 pages.

* cited by examiner

Primary Examiner — James Harvey
(74) Attorney, Agent, or Firm — Osha Liang LLP

(57) ABSTRACT

A stator and a rotator, which relatively rotate concentrically with a steering, are formed. A torque transmitting portion, which transmits a rotation torque of the steering to an angle detection rotating body provided in an angle detection sensor for detecting a rotation angle of the steering, is formed concentrically with the angle detection rotating body. Fitting portions for fitting to fitting allowance portions, which are formed on at least a part of a circumferential direction of the angle detection rotating body, are formed on the torque transmitting portion. Fitting abutting portions of the fitting portions, which fit and abut against the fitting allowance portions, are formed in shapes tapered toward the fitting allowance portions.

3 Claims, 13 Drawing Sheets

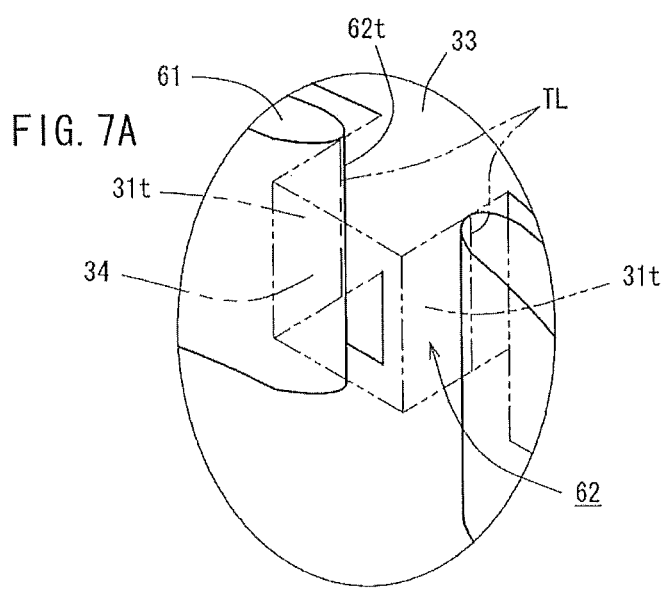
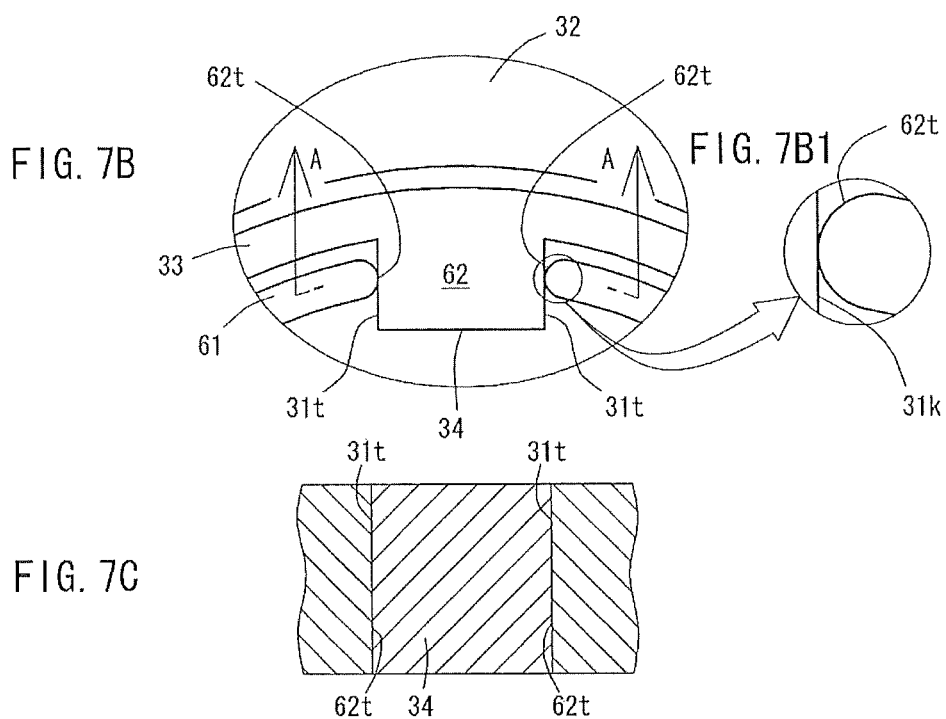

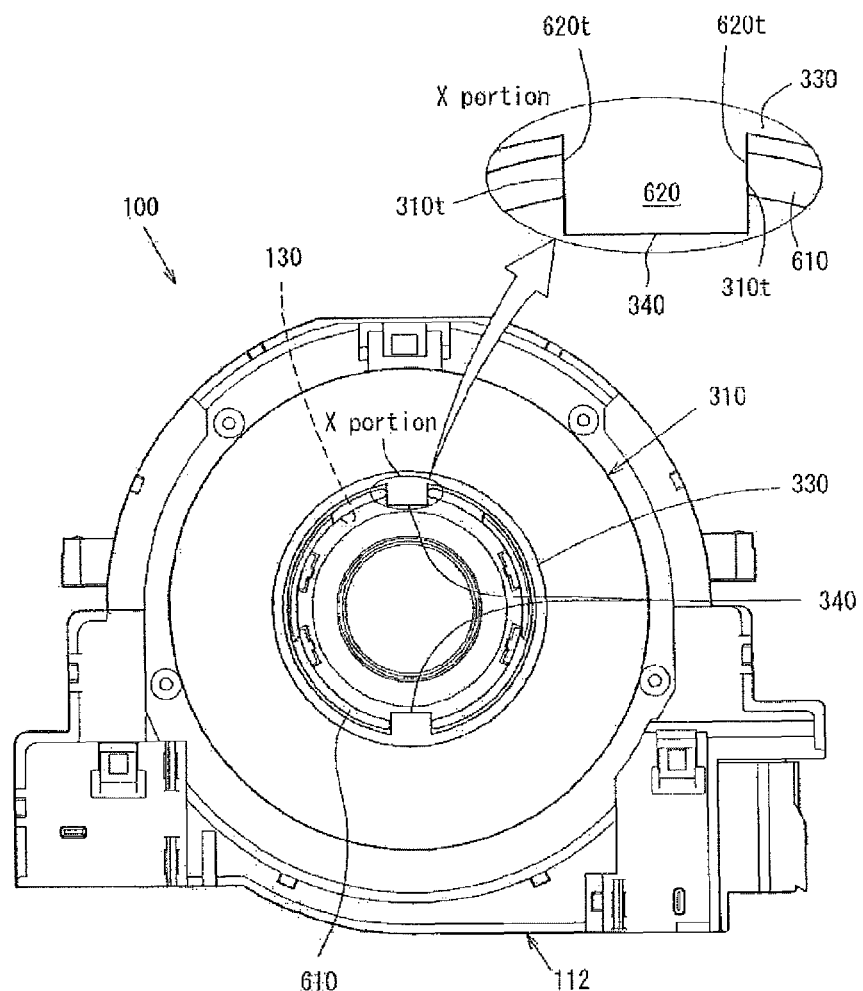
*Prior Art*

ROTARY CONNECTOR DEVICE

TECHNICAL FIELD

The present invention relates to a rotary connector device used for electrical connection between a steering wheel side and an automobile body side. More specifically, the present invention relates to a rotary connector device which can have an angle detecting function for detecting a rotation angle of a steering.

BACKGROUND ART

The rotary connector device mounted on a vehicle such as automobiles and the like includes a cable housing formed of a stator and a rotator to be assembled on a same axis so as to be relatively rotatable.

The rotary connector device has the stator secured to the automobile body and the rotator assembled on the steering wheel in the cable housing, and electrically connects a horn module, air bag module, power supply, and the like, for example, between the automobile body and the steering wheel.

In recent years, a rotary connector device which comprises an angle detection sensor near the rotary connector device and has an angle detecting function for detecting a rotation angle of a steering of a steering wheel has been proposed.

A combination switch device in Patent Document 1 is one of the rotary connector devices having the angle detecting function as described above, and has a structure including a roll connector unit as a rotary connector device and a sensor unit having an angle detecting function.

Since the rotary connector device has the angle detecting function as described above, it can be applied to various types of control such as control of a damping force of a suspension, for example, based on angle information obtained from an angle detection sensor.

The rotary connector devices having the angle detecting function as described above include, for example, a type which can obtain a rotation angle of the steering with an angle detection sensor 310 detecting a rotation of a rotator 130, which rotates in association with a steering, as shown in FIG. 13.

FIG. 13 is a bottom view of a conventional rotary connector device 100 having an angle detecting function.

In the conventional rotary connector device 100 shown in FIG. 13, the angle detection sensor 310 secured to an automobile side is attached to a lower side of a stator 112. On an inner peripheral side of the angle detection sensor 310, an angle detecting rotating body 330 which rotates independently from the main body of the angle detection sensor 310 and concentrically with the steering is provided.

A rotator 130 of the rotary connector device 100 as described above comprises a torque transmitting portion 610 which rotates concentrically with the angle detecting rotating body 330 and transmits rotation torque of the steering to the angle detecting rotating body 330.

The torque transmitting portion 610 is located so as to oppose the angle detecting rotating body 330 on a radially internal side.

Further, as shown in an enlarged view of X portion in FIG. 13, a fitting protrusion 340 for fitting to the torque transmitting portion 610 is formed on at least apart of a circumferential direction of the angle detecting rotating body 330. A fitting trench portion 620 for allowing the fitting protrusion 340 to fit is formed on the torque transmitting portion 610.

Since the fitting protrusion 340 and the fitting trench portion 620 fit to each other, the angle detecting rotating body 330 can rotate with the torque transmitting portion 610 in association with a rotation of the steering, and the angle detecting sensor 310 can detect an angle based on the rotation of the angle detecting rotating body 330.

However, as shown in X portion in FIG. 13, abutting portions of both the fitting protrusion 340 and the fitting trench portion 620 are formed in plate shapes. Specifically, both sides in a width direction of the fitting protrusion 340 are formed planarly, and both sides in a width direction of the fitting trench portion 620 are formed planarly.

Thus, the abutting portions of the fitting protrusion 340 and the fitting trench portion 620 abut each other planarly, causing a colliding sound or a scraping sound to be made easily when a torque is transmitted from the torque transmitting portion 610 to the angle detecting rotating body 330.

Accordingly, there has been a problem that, every time the rotating operation of the steering is performed, an annoying sound is made and a quiet and comfort driving is disturbed.

PRIOR ART DOCUMENT

Patent Document

Patent Document 1: Laid-Open Publication No. 2000-211440

SUMMARY OF THE INVENTION

Problems to be Solved by the Invention

An objective of the present invention is to provide a rotary connector device and a fitting structure of a rotary connector unit and an angle detecting unit which can realize a quiet and comfort running with no annoying sound such as a colliding sound or scraping sound being made when a rotating operation of a steering is performed.

Means for Solving the Problems

The present invention is a rotary connector device, in which: a stator and a rotator, which rotates with respect to the stator concentrically with a steering, are formed; a torque transmitting portion, which rotates together with the rotator and which transmits a rotation torque of the steering to an angle detection rotating body provided in an angle detection sensor for detecting a rotation angle of the steering, is formed concentrically with the angle detection rotating body; and a fitting portion for fitting to a fitting allowance portion, which is formed on at least a part of a circumferential direction of the angle detection rotating body, is formed on the torque transmitting portion, characterized in that a fitting abutting portion of the fitting portion, which fits and abuts against the fitting allowance portion, is formed in a shape tapered toward the fitting allowance portion.

As one embodiment of the present invention, the torque transmitting portion may be formed into a tubular shape; and the fitting abutting portion may be formed to be thicker than a proximal end side of the fitting abutting portion.

As another embodiment of the present invention, the fitting portion may be formed into a notched shape, which is formed by notching at least a part of a circumferential direction of the torque transmitting portion.

Further, the present invention is a fitting structure of a rotary connecter unit and an angle detection unit, comprising: a rotary connector unit formed of a stator and a rotator which rotates with respect to the stator concentrically with a steering; and an angle detection unit for detecting a rotation angle of the steering, in which: the angle detection unit includes an angle detection rotating body which rotates in association with a rotation of the steering and concentrically with the steering; a torque transmitting portion which rotates together with the rotator and transmits a torque of the steering to the angle detection rotating body is formed in the rotary connector unit; a fitting portion for fitting to the angle detection rotating body is formed in the torque transmitting portion; and a fitting allowance portion for allowing fitting to the fitting portion is formed on at least a part of a circumferential direction of the angle detection rotating body, the fitting structure of the rotating connector unit and the angle detection unit, characterized in that at least one of fitting abutting portion of the fitting portion, which fits and abuts the fitting allowance portion, and the fitting allowance abutting portion of the fitting allowance portion, which abuts the fitting abutting portion, is formed into a shape tapered toward the other.

The fitting portion is not particularly limited as long as it has a structure to fit to the fitting allowance portion, and may have, for example, a convex shape, concave shape, trench shape, or the like.

Similarly, the fitting allowance portion is not particularly limited as long as it can be formed into a corresponding concave shape or trench shape when the fitting portion is formed into a protruded shape, or can be formed into a corresponding protruded shape when the fitting portion is formed into a concave shape or trench shape, for example, and it has a structure to fit to the fitting portion.

The shape of the fitting abutting portion is not particularly limited as long as it is tapered toward the fitting allowance portion, for example, bent shape such as arc shape, tapered shape, or tapered shape with the tip thereof made flat, and the like.

Signals detected by the angle detection sensor is not limited to a pulse signal or an electric signal, and the detection signals include signals treated with a process such as filtering, for example, as long as they are signals which can be applied as angle information.

When the angle detection sensor has a function to convert the rotation angle into a number of pulse, the conversion method thereof is not limited to a photoelectric type, brush type, magnetic type or the like, and may be either incremental type or absolute type.

Effect of the Invention

According to the present invention, a rotary connector device and a fitting structure of a rotary connector unit and an angle detecting unit, which can realize a quiet and comfort running with no annoying sound such as a colliding sound or scraping sound being made when a rotating operation of a steering is performed, can be provided.

BRIEF DESCRIPTION OF DRAWINGS

FIG. 7A A diagram explaining a fitting structure of an angle detecting rotating body and a torque transmitting portion of the present embodiment.

FIG. 7B An enlarged view of the fitting structure shown in FIG. 7A.

FIG. 7B1 An partially enlarged view of the fitting structure shown in FIG. 7B.

FIG. 7C A cross sectional view along line A-A in FIG. 7B.

FIG. 13 A bottom view of a conventional rotary connector device with a part thereof being enlarged.

DESCRIPTION OF EMBODIMENTS

Figure 1:
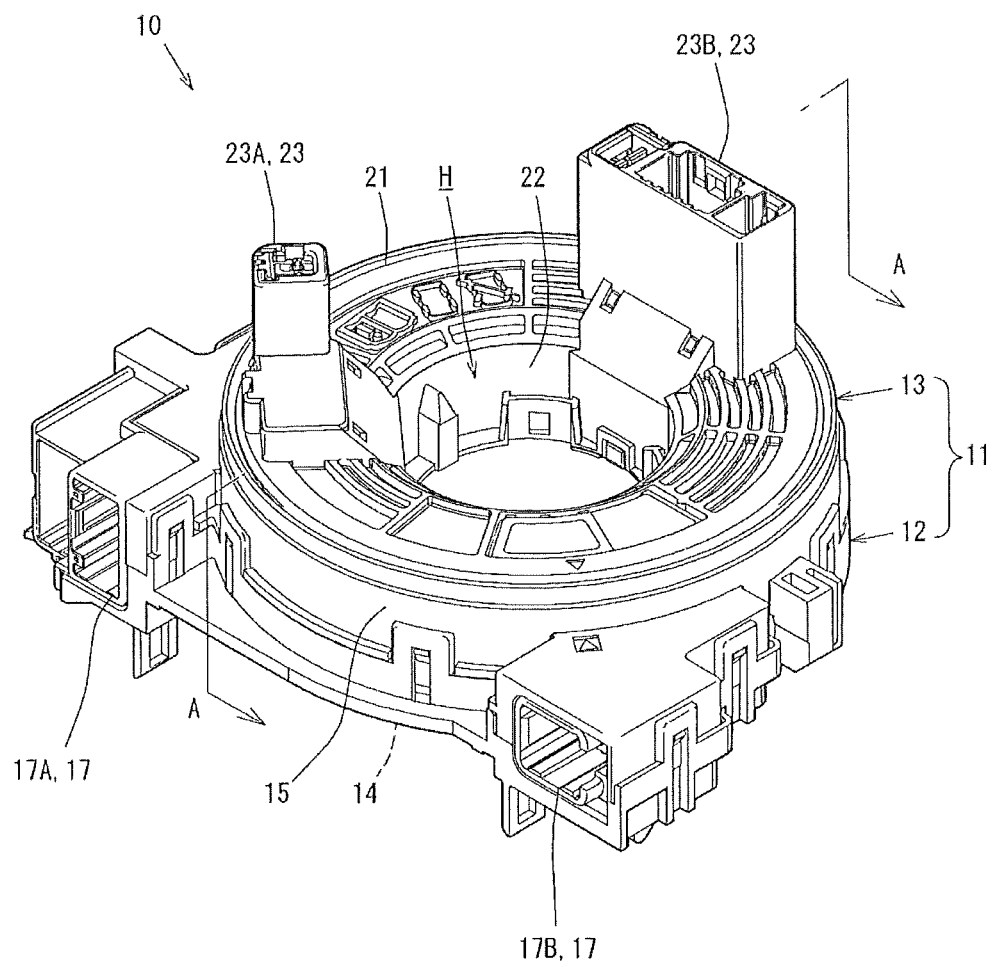
FIG. 1 An outline view of a steering roll connector of the present embodiment.

An embodiment of the present invention is described hereinafter with reference to the drawings.

As shown in FIGS. 1 through 6, a steering roll connector 10 according to the present embodiment is formed of a cable housing 11, a retainer 41, a rotation lock structure 51, and an angle detection unit 30.

The cable housing 11 is formed into a substantially tubular shape with an insertion hole H which penetrates through in a direction of a rotating shaft of a steering (a vertical direction in FIG. 5) being formed in a central portion in a plan view. The insertion hole H is formed to have a diameter which allows a steering shaft (not shown) supported by a column of the steering (not shown) to be inserted.

To an upper end of the steering shaft, a steering wheel for performing a rotating operation is secured.

Figure 2:
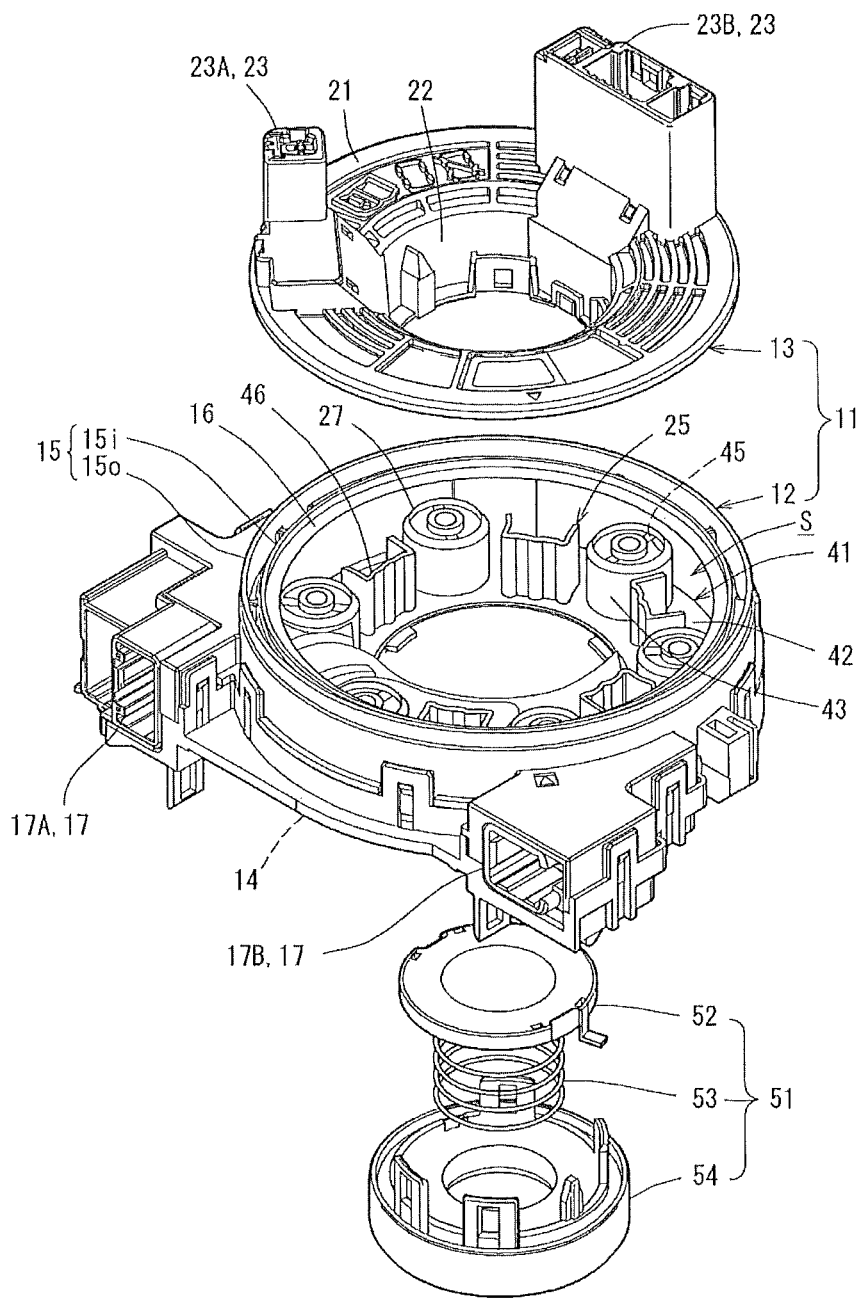
FIG. 2 An exploded perspective view of the steering roll connector of the present embodiment.

The cable housing 11 is a case having a substantially tubular shape which is formed of a stator 12 and a rotator 13 which can relatively rotate with respect to each other. In the cable housing 11, an accommodating space S for accommodating a flexible flat cable C (hereinafter, referred to as "flat cable C") in an appropriately wound state is formed as shown in FIGS. 2, 5 and 6.

The stator 12 is secured to an appropriate member of an automobile body, for example, a combination bracket switch (not shown) of the steering column, and is attached so as to be relatively rotatable with respect to the steering wheel. The stator 12 is formed of a securing side ring plate 14 formed in a ring shape as a bottom plate and an outer peripheral tube portion 15 of a tubular shape, which is elongated vertically from an outer peripheral edge of the securing side ring plate 14. The stator 12 is integrally formed by fitting the outer peripheral edge of the securing side ring plate 14 to a lower edge of the outer tube portion 15.

Figure 5:
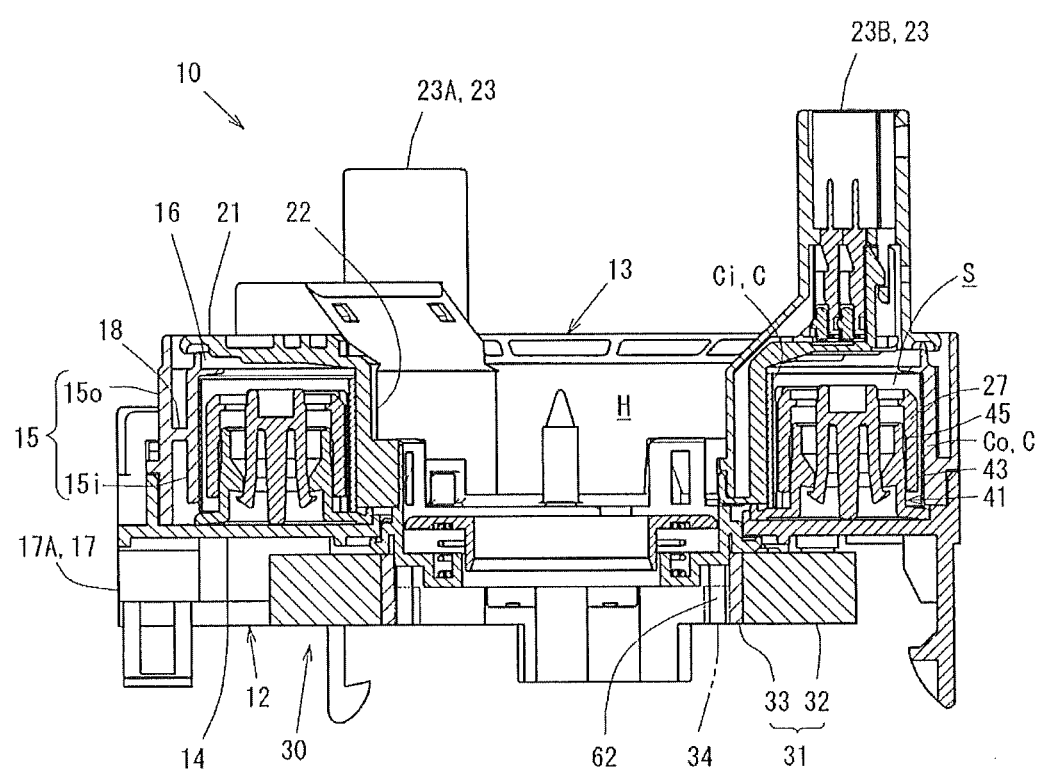
FIG. 5 A cross sectional view on arrow along line A-A in FIG. 1.
Figure 6:
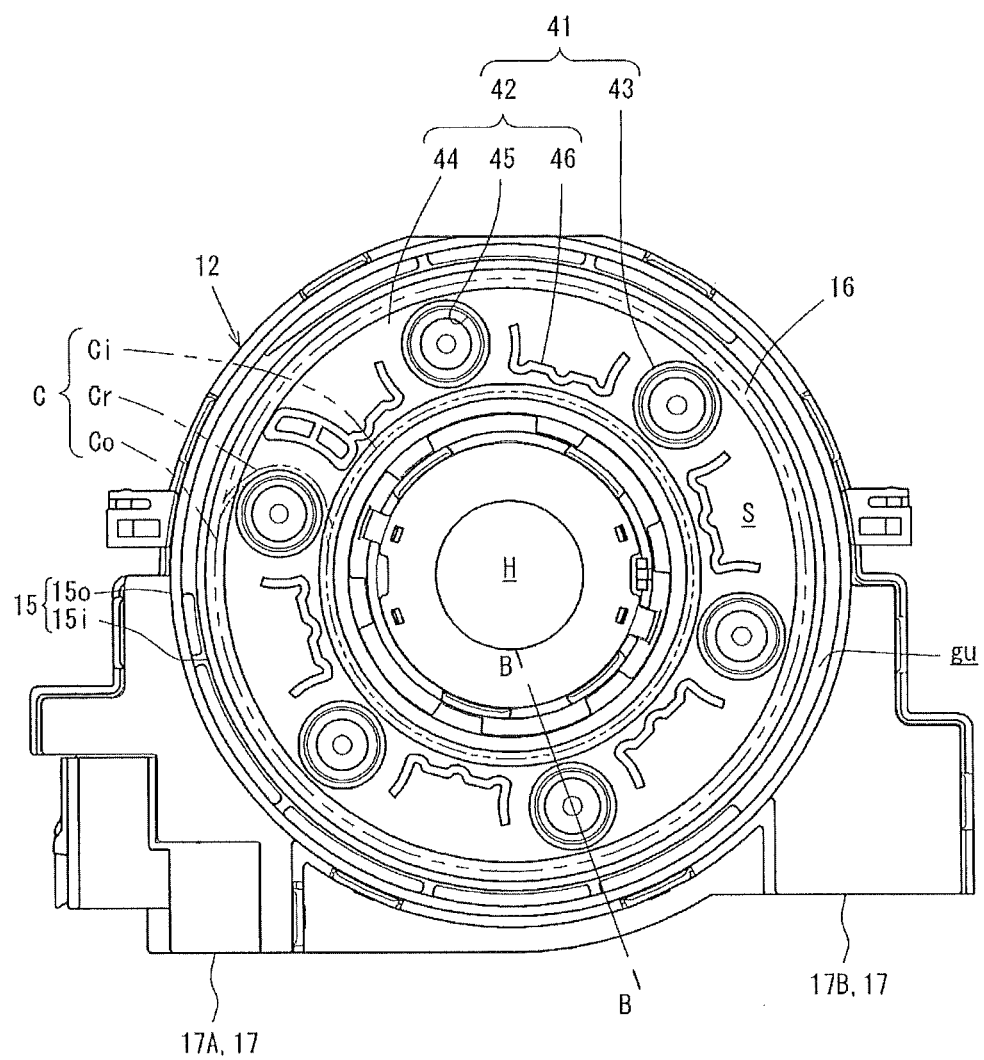
FIG. 6 A plan view of the steering roll connector of the present embodiment without a rotator.

As shown in FIG. 5, the outer peripheral tube portion 15 is formed of an external side outer peripheral tube portion 15o of a tubular shape, and an internal side outer peripheral tube portion 15i of a tubular shape which has a diameter slightly smaller than the external side outer peripheral tube portion 15o, and has a double-layer structure with the external side outer peripheral tube portion 15o and the internal side outer peripheral tube portion 15i being arranged in a concentric pattern so as to oppose each other closely in a radial direction.

To the stator 12, a stator side connector 17 is attached.

The stator side connector 17 is formed of a first stator side connector 17A and a second stator side connector 17B. The first stator side connector 17A and the second stator side connector 17B are located outside the outer peripheral tube portion 15 (the external side outer peripheral tube portion 15o) such that connecting ports thereof face the same direction with a predetermined space therebetween.

The rotator 13 is formed of a rotating side ring plate 21 which is formed into a ring shape as a top plate and an inner peripheral tube portion 22 of a tubular shape which is elongated vertically from an inner peripheral edge of the rotating side ring plate 21. The rotator 13 has a structure such that it rotates together with the steering wheel. The rotator 13 can rotate around a shaft same as the rotating shaft of the steering with respect to the stator 12.

The rotating side ring plate 21 is located so as to oppose the securing side ring plate 14 in a direction of the rotating shaft of the rotator 13.

The direction of the rotating shaft of the rotator 13 is same as the rotating shaft direction of the steering as described above (the vertical direction in FIG. 5).

The inner peripheral tube portion 22 is located so as to oppose the outer peripheral tube portion 15 on the internal side in a radial direction (a horizontal direction in FIG. 5).

To the rotator 13, the rotator side connector 23 which rotates together with rotation of the rotator 13 is attached.

The rotator side connector 23 is formed of a first rotator side connector 23A and a second rotator side connector 23B.

The first rotator side connector 23A and the first stator side connector 17A, and the second rotator side connector 233 and the second stator side connector 17B are electrically connected to each other by the flat cable C located in the accommodating space S.

The stator side connector 17 is connected to cables (not shown) drawn out from an electric circuit or the like on an automobile body in a lower column cover (not shown).

The rotator side connector 23 is connected to cables (not shown) drawn out from an electric circuit such as horn switch, air bag unit and the like, for example.

Further, as shown in FIGS. 5 and 6, the retainer 41 described above is formed of a plurality of rotation rollers 43 and a base ring 42, and is located so as to be rotatable with a rotating shaft of the rotator 13 being the center in the accommodating space S.

The same number of rotation rollers 43 as roller supporting protrusions 45 which will be described later are provided, and are respectively shaft-supported by the roller supporting protrusions 45. Each of the rotation rollers 43 is provided so as to be rotatable with an axis parallel to the rotating shaft of the rotator 13 being the center.

The base ring 42 is formed of a plate-like base ring main body portion 44 which has a ring shape in a plan view, the roller supporting protrusions 45, and a roller outer peripheral side protrusions 46.

The base ring main body portion 44 is located close to the securing side ring plate 14 in a slidable manner, and is formed so as to be relatively rotatable with respect to the stator 12. The roller supporting protrusions 45 protrude upward in equal intervals in the circumferential direction of the base ring main body portion 44 in a manner that they can shaft-support the rotation rollers 43.

The roller outer peripheral side protrusions 46 protrude upward with respect to the base ring main body 44 such that they guide folded portions of the flat cable C, which are folded around the rotation rollers 43 as will be described later (reversed portions Cr as will be described later), from the radially external side on the outside of the roller supporting protrusions 45.

The flat cable C is a flexible transmission line of a band shape which has a plurality of flat rectangular conductors Ca aligned parallel in predetermined pitches and is coated with an electric insulator Cb.

Two flat cables C are provided in the accommodating space S, and two cables are overlapped and wound in a circle in the accommodating space S. One end of one of the two overlapped flat cables C in a length direction is connected to the first stator side connector 17A, and one end of the other of the two flat cables C in a length direction is connected to the second stator side connector 17B.

The other end of the one of the two overlapped flat cables C in the length direction is connected to the first rotator side connector 23A, and the other end of the other of the two flat cables C in the length direction is connected to the second rotator side connector 23B.

Such flat cables C are supported by the retainer 41 which is placed so as to be rotatable with respect to the securing side ring plate 14 in the accommodating space S in the cable housing 11, and are accommodated in a state wound into a circle.

Specifically, the flat cables C are drawn into the accommodating space S from the first stator side connector 17A and the second stator side connector 17B in the accommodating space S, and as shown in FIGS. 5 and 6, an outer wound portion Co which is wound along an inner peripheral surface of the outer peripheral tube portion 15 (internal side outer peripheral tube portion 15i) of the stator 12 on the outside of the retainer 41 is formed.

Accordingly, a proximal end of the outer wound portion Co is secured at the position of the stator side connector 17.

As described above, two flat cables C are overlapped and wound in a circle as a pair in the accommodating space S. However, for the sake of convenience, only one is shown in a state wound into a circle in FIGS. 5 and 6.

As shown in FIG. 6, the flat cable C is wound to one of the plurality of the rotation rollers 43 into a U-shape in the middle of the length direction to form a reversed portion Cr which has a reversed direction.

Then, an inner wound portion Ci is formed by winding the other end of the flat cable C in the length direction along an outer peripheral surface of the inner peripheral tube portion 22 of the rotator 13 on the inside of the retainer 41. As shown in FIGS. 5 and 6, the flat cables C are finally drawn out from the accommodating space S and are connected to the first rotator side connector 23A and the second rotator side connector 23B.

Accordingly, a proximal end of the inner wound portion Ci is secured at the position of the rotator connector 23.

In the accommodating space S, the flat cables C are either wound to or released from between the outer wounding portions Co and the inner wounding portions Ci when the rotator 13 rotates with respect to the stator 12.

The reversed portions Cr of the flat cables C appropriately rotate together with the retainer 41 so as to follow changes in a balance in wound states between the outer wound portions Co and the inner wound portions Ci. In this way, the steering roll connector 10 can always retain the flat cables C aligned in the wound state in the accommodating space S, and also enables a smooth rotating operation of the steering wheel.

Now, the rotation lock structure 51 mentioned above is described briefly. As shown in FIG. 2, the rotation lock structure 51 is formed of a lock member 52, a spring receiving sleeve 54, and a return spring 53 provided between the lock member 52 and the spring receiving sleeve 54.

By pushing up the spring receiving sleeve 54 in resistance to a biasing force of the return spring 53, the rotator 13 can be locked by the lock member 52 so as not to relatively rotate with respect to the stator 12. By inserting a boss portion (not shown) of a metal core of the steering wheel, lock by the lock member 52 can be released so as to allow free relative rotation.

Finally, the angle detection unit 30 is described with reference to FIGS. 3 through 5 and FIGS. 7(A), 7(B), 7(B1), and 7(C).

Figure 3:
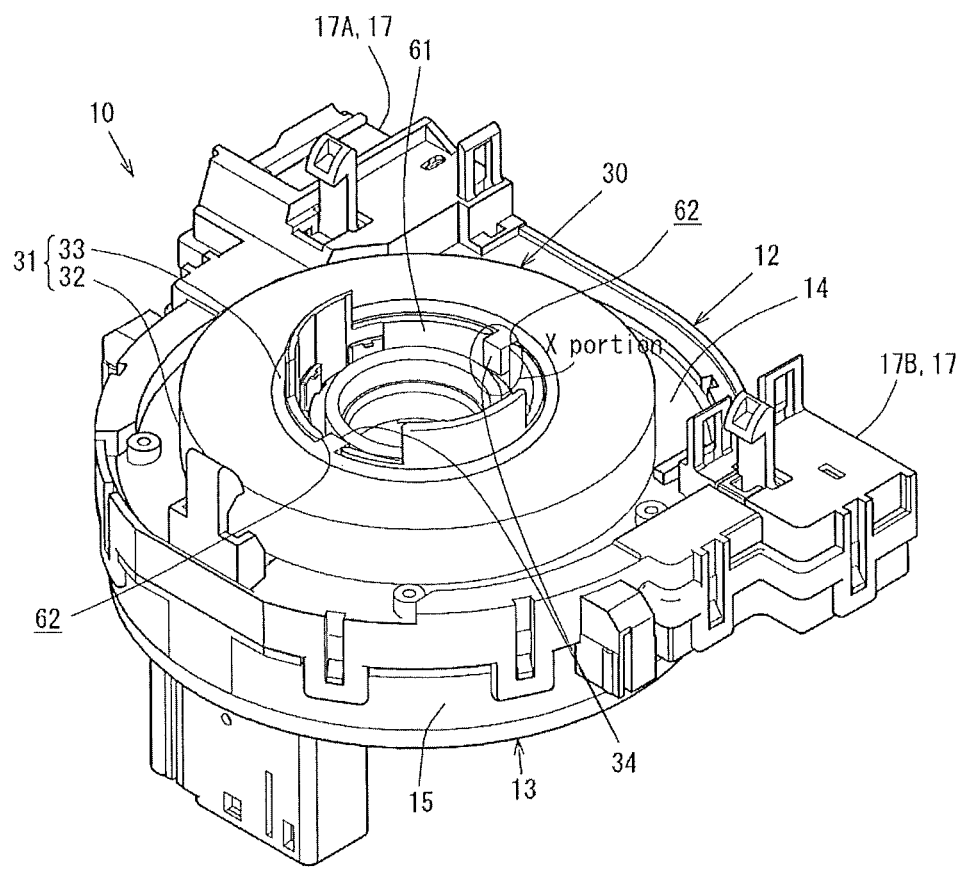
FIG. 3 An outline view of the steering roll connector of the present embodiment viewed from a lower side.

FIG. 7(A) is an enlarged view partially showing X portion in FIG. 3. FIG. 7(B) is an enlarged view of X portion in FIG. 4. FIG. 7(B1) is an partially enlarged view of FIG. 7(B). FIG. 7(C) is a cross sectional view along line A-A in FIG. 7(B).

Figure 4:
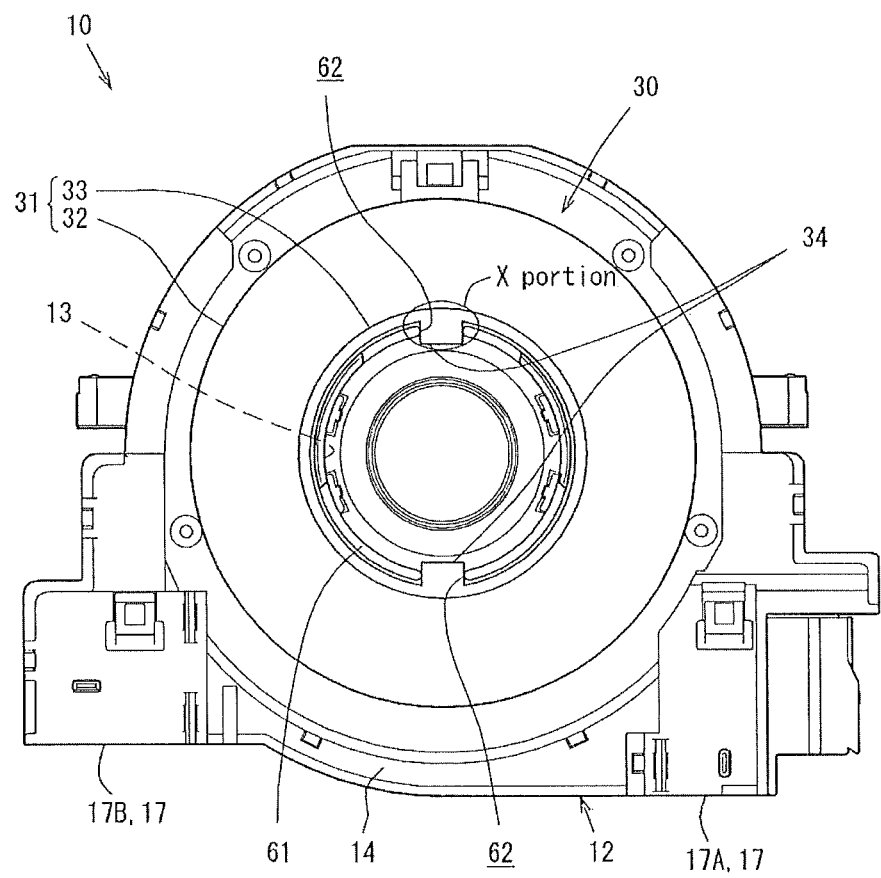
FIG. 4 A bottom view of the steering roll connector of the present embodiment.

As shown in FIGS. 3 through 5, the angle detection unit 30 is formed of an angle detection sensor 31 for detecting a rotation angle of the steering and a torque transmitting portion 61 for transmitting a torque of the steering to the angle detection sensor 31.

The angle detection sensor 31 is formed of an angle detection sensor main body 32 and an angle detection rotating body 33.

The angle detection sensor main body 32 is formed into a ring shape in a plan view (bottom view), and is mounted to a lower surface of the securing side ring plate 14 concentrically with a rotation axis of the steering.

The angle detection sensor main body 32 has a pulse generating function for generating in response to a rotation angle of the rotation of the angle detection rotating body 33. A counter circuit for counting a generated number of pulse, microcomputer for calculating and storing, and the like are incorporated in the angle detection sensor main body 32, and a connector (not shown) to be connected to an electric circuit of the automobile body side is provided.

The angle detection rotating body 33 is located concentrically with the rotation axis of the steering on an inner peripheral side of the angle detection sensor main body 32.

The torque transmitting portion 61 is elongated downward from a lower end of the inner peripheral tube portion 22 of the rotator 13 in a state as shown in FIG. 5, and is formed into a substantially tubular shape which rotates together with a rotation of the rotator 13.

The torque transmitting portion 61 is located concentrically with the rotation axis of the steering on a radially internal side of the angle detection rotating body 33.

As shown in FIGS. 3 through 5 and 7, on the torque transmitting portion 61 and the angle detection rotating body 33, fitting structures 34 and 62 for fitting each other such that the rotation torque of the steering is transmitted to the angle detection rotating body 33 via the torque transmitting portion 61.

Specifically, on predetermined opposing portions of the torque transmitting portion 61, which oppose each other in a diametrical direction across the rotary center, fitting trench portions 62 for allowing fitting to the angle detection rotating body 33 are formed. The fitting trench portions 62 have trench shapes notched so as to divide a circumference of the torque transmitting portion 61 along the axis direction of the steering.

On the other hand, on predetermined opposing portions of an inner peripheral surface of the angle detection rotating body 33, which oppose each other in a diametrical direction across the rotary center, fitting protrusions 34 which protrude radially inward so as to fit to the fitting trench portions 62 are formed.

Further, as shown in FIGS. 7(A) and 7(B), on both ends in a width direction of the fitting trench portions 62 of the torque transmitting portion 61, rotator side abutting portions 62t, which fit to and abut against the fitting protrusions 34, are formed. The rotator side abutting portions 62t are formed into arc shapes in a plan view, which are tapered toward the fitting protrusions 34 (see FIG. 7(B1).

On both ends in a width direction of the fitting protrusions 34 of the angle detection rotating body 33, sensor side abutting portions 31t, which fit to and abut against the rotator side abutting portions 62t, are formed. The sensor side abutting portions 31t are formed into planar shapes.

Since the fitting trench portions 62 and the fitting protrusions 34 fit to each other, the angle detection rotating body 33 rotates in association with the rotation of the steering when the torque of the steering is transmitted from the torque transmitting portion 61.

The steering roll connector 10 of the present embodiment can achieve various functions and effects. Particularly, since the angle detection unit 30 as described above is provided, the following functions and effects can be achieved.

As shown in FIG. 7, since the angle detection unit 30 has a structure in which the fitting trench portions 62 of the torque transmitting portion 61 and the fitting protrusions 34 of the angle detection rotating body 33 fit to each other, the rotation torque of the steering can be transmitted to the angle detecting body 33 and a hitting sound or a scraping sound can be prevented.

Specifically, in the conventional angle detection unit 100 as shown in FIG. 13, rotator abutting portions 620t in the fitting trench portions 620 of the torque transmitting portions 610 and sensor side abutting portions 310t in the fitting protrusions 340 of the angle detection rotating body 330 are all formed into planar shapes.

With such a structure, when the angle detection rotating body 330 rotates in association with the rotation of the steering, the torque is transmitted from the torque transmitting portion 610 to the angle detection rotating body 330 with the rotator abutting portions 620t and the sensor side abutting portions 310t planarly abutting against each other. Accordingly, the abutting portion between the rotator abutting portions 620t and the sensor side abutting portions 310t becomes large, and a hitting sound or a scraping sound can be easily made.

Particularly, since the rotator abutting portions 620t and the sensor side abutting portions 310t collide or scrape against each other repeatedly, and there is an influence due to aging, play is created in the fitting portions. The influence becomes gradually larger, and a hitting sound or a scraping sound can be made more easily.

On the other hand, in the angle detection unit 30 of the present embodiment, the rotator side abutting portions 62t in the fitting trench portions 62 of the torque transmitting portion 61 are formed into arc shapes in a plan view (bottom view), which are tapered toward the sensor side abutting portions 31t as described above (see FIG. 7(b1)).

Accordingly, when the angle detection rotating body 33 rotates in association with the rotation of the steering, the abutting portions where the rotator side abutting portions 62t having the arc shapes in a plan view abut against the sensor side abutting portions 31t having the planar shapes are not planar, but are abutting lines TL, which elongate linearly along the rotation axis direction of the steering, as shown in FIG. 7(A).

Therefore, the abutting area of the rotator abutting portions 62t and the sensor side abutting portions 31t can be made small, and thus, the abutting portions when they abut against each other can be decreased to reduce the hitting sound. Also, the scraping sound generated when planes scrape against each other can be suppressed significantly. In this way, a quiet and comfortable running can be realized.

Since the fitting trench portions 62 are formed into trench shapes which are notched to divide the circumferential direction of the torque transmitting portion 61 (see FIG. 7(B)), the torque transmitting portion 61 can be formed with an outer peripheral surface which does not have a protruding portion protruding in a radially external direction (see FIGS. 3 and 4).

Accordingly, a structure which can be easily handled, with no concern that a cable or the like routed around get caught even when the angle detection sensor 31 is not mounted on the lower portion of the securing side ring plate 14, can be achieved.

The angle detection unit 30 is not limited to the above-described embodiment, and can be formed with various embodiments. Hereinafter, angle detection units of other embodiments will be described, but the structures similar to those in the angle detection unit 30 of the above-described embodiment will be referred to with the same reference numerals, and the descriptions thereof are omitted.

Figure 8A:
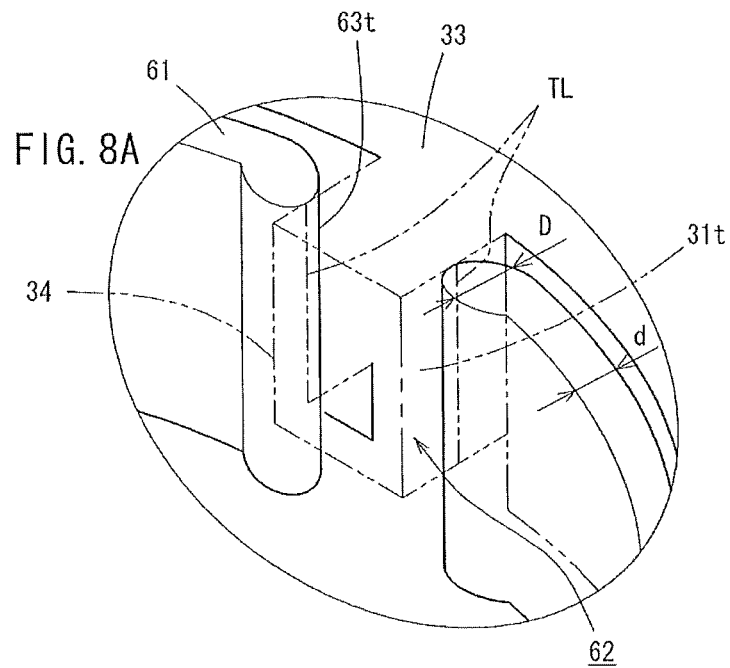
FIG. 8A A diagram explaining a fitting structure of an angle detecting rotating body and a torque transmitting portion of another embodiment.
Figure 8B:
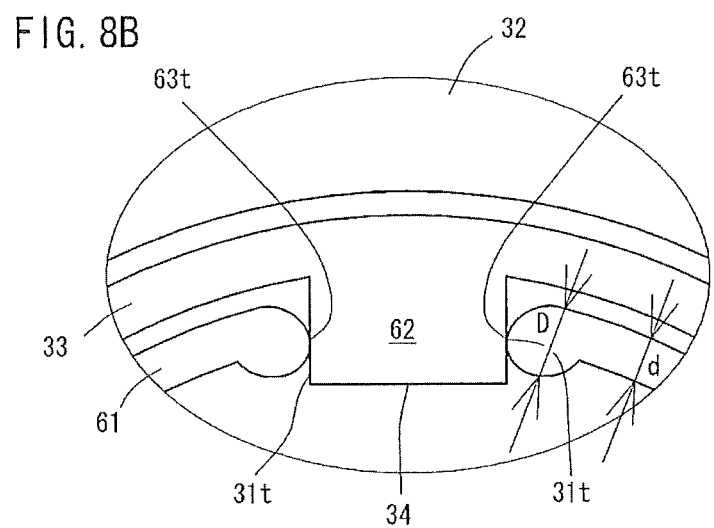
FIG. 8B An enlarged view of the fitting structure in FIG. 8A.

As shown in FIGS. 8(A) and 8(B) as another embodiment, rotator side abutting portions 63t can be formed to be thicker than a proximal end of the rotator side abutting portions 63t. Specifically, the torque transmitting portion 61 has the rotator side abutting portions 63t on both sides in a width direction of the fitting trench portion 62 formed to have a thickness (D) larger than a thickness (d) of other portions in a circumferential direction and into arc shapes in a plan view which are tapered toward tip portions.

FIG. 8(A) is a diagram which shows the rotator side abutting portions 63t of another embodiment and neighboring portions and which corresponds to FIG. 7(A). FIG. 8(B) is a diagram which shows the rotator side abutting portions 63t of another embodiment and neighboring portions and which corresponds to FIG. 7(B).

The rotator side abutting portions 63t transmit the torque from the torque transmitting portion 61 to the angle detection rotating body 33 while they abut against the sensor side abutting portions 31t. Thus, load tends to be applied particularly to the rotator side abutting portions 63t. Furthermore, since they are formed into tapered shape as described above, strength is particularly required for these portions.

Since such rotator side abutting portions 63t are formed to be thicker than other portions in the circumferential direction of the torque transmitting portion as described above, a sufficient strength can be maintained. At the same time, since they have arc shapes in a plan view, the area of the abutting portions can be reduced and the annoying sound can be prevented.

Figure 9A:
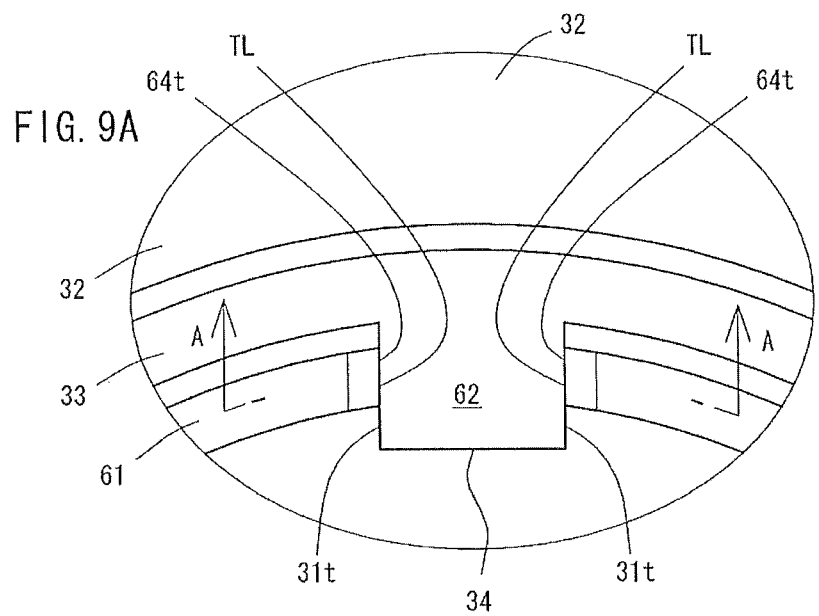
FIG. 9A A diagram explaining a fitting structure of an angle detecting rotating body and a torque transmitting portion of another embodiment.
Figure 9B:
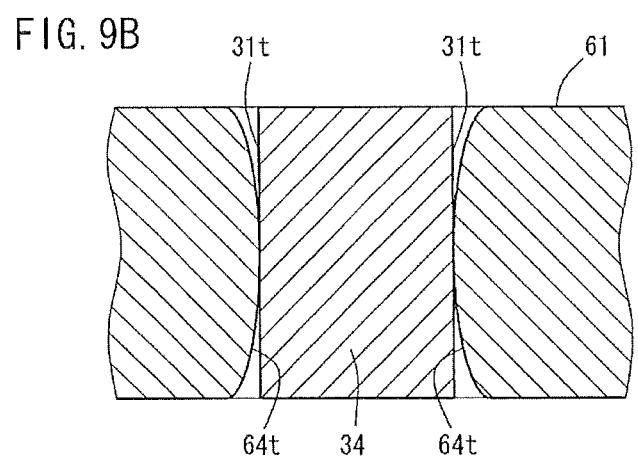
FIG. 9B A cross sectional view along line A-A in FIG. 9A.

As yet another embodiment, the rotator side abutting portions are not limited to the structure in which they are formed into the arc shapes in a plan view to have the tapered shapes as described above, but rotator side abutting portions 64t of the torque transmitting portion 61 may have tapered shapes which protrude in curve shapes toward the sensor abutting portions 31t with middle portions in a downward extended direction of the torque transmitting portion 61 being tips as shown in FIGS. 9(A) and 9(B).

The downward extending direction of the torque transmitting portion 61 is a rotation shaft direction of the steering (vertical direction in FIG. 9(B)).

FIG. 9(A) is a diagram which shows the rotator side abutting portions 64t of another embodiment and neighboring portions and which corresponds to FIG. 7(B). FIG. 9(B) is a cross sectional view along line A-A in FIG. 9(A).

With such a structure, since the rotator side abutting portions 64t have the arc shapes as described above, the tip portions of the rotator side abutting portions 64t abut the sensor side abutting portions 31t when the fitting trench portions 62 and the fitting protrusions 34 fit to each other.

As shown in FIG. 9(A), the abutting portions of the rotator side abutting portions 64t against the sensor side abutting portions 31t are abutting lines TL which linearly extend along a thickness direction of the torque transmitting portion 61. Thus, the area of the abutting portion of the rotator side abutting portions 64t and the sensor side abutting portions 31t can be reduced and the annoying noise can be prevented.

Figure 10A:
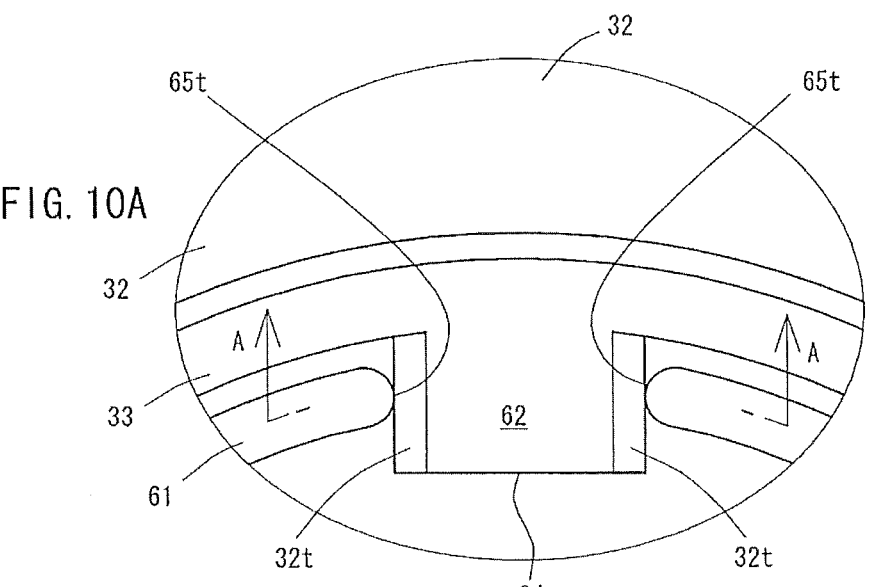
FIG. 10A A diagram explaining a fitting structure of an angle detecting rotating body and a torque transmitting portion of another embodiment.
Figure 10B:
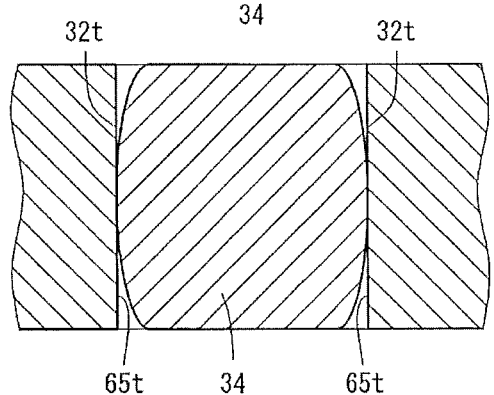
FIG. 10B A cross sectional view along line A-A in FIG. 10A.

As shown in FIGS. 10(A) and 10(B) as further another embodiment, the torque transmitting portion 61 has rotator side abutting portions 65t formed into tapered shapes which have arc shapes in a plan view as described above.

On the other hand, the angle detection rotating body 33 has sensor side abutting portions 32t of the fitting protrusions 34 having middle portions in the downward extended direction of the torque transmitting portion 61 protruded toward the rotator side abutting portions 65t (see FIG. 10(B)), and the fitting protrusions 34 are formed into a tapered shape with both sides in a width direction having arc shapes when viewed from a front.

FIG. 10(A) is a diagram which shows the rotator side abutting portions 65t of another embodiment and neighboring portions and which corresponds to FIG. 7(B). FIG. 10(B) is a cross sectional view along line A-A in FIG. 10(A).

With the above-described structure, when the fitting trench portions 62 of the torque transmitting portion 61 and the fitting protrusions 34 of the angle detection rotating body 33 fit to each other, the rotator side abutting portions 65t having arc shapes in a plan view abut the sensor side abutting portions 32t having arc shapes in a front view at points, and the torque is transmitted from the torque transmitting portion 61 to the angle detection rotating body 33.

Accordingly, an area of the abutting portions of the rotator side abutting portions 65t and the sensor side abutting portions 32t can be made small, and a quiet and comfort running with no annoying sound can be achieved as described above.

As further another embodiment, the torque transmitting portion 61 and the angle detection rotating body 33 may have the fitting trench portions and the fitting protrusions formed in reversed combinations.

Figure 11:
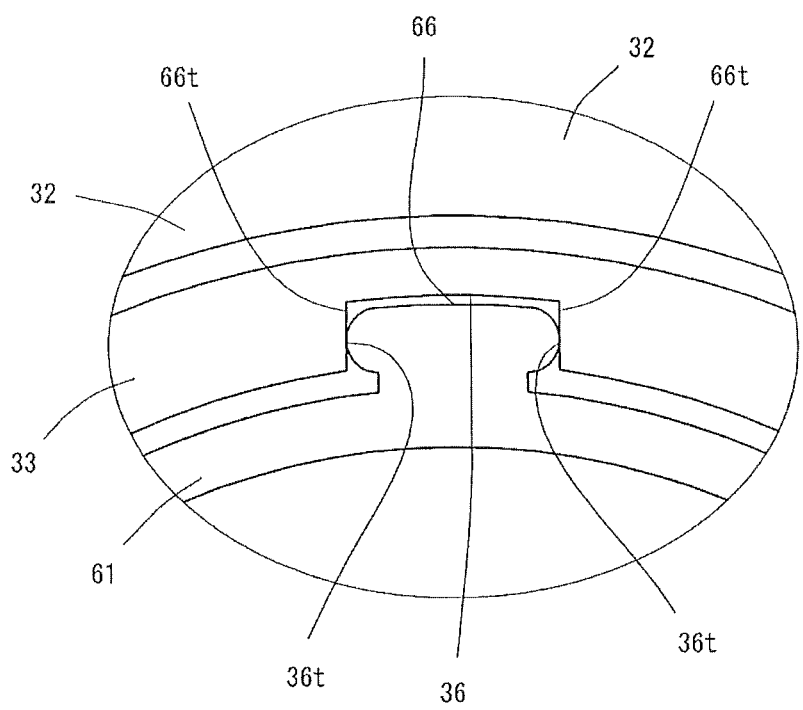
FIG. 11 A diagram explaining a fitting structure of an angle detecting rotating body and a torque transmitting portion of another embodiment.

Specifically, as shown in FIG. 11, on predetermined opposing portions of an outer peripheral surface of the torque transmitting portion 61, which oppose each other in a diametrical direction across the center, fitting protrusions 66 which protrude toward a radially external direction so as to fit the angle detection rotating body 33 are formed.

FIG. 11 is a diagram which shows rotator side abutting portions 66t of another embodiment and neighboring portions and which corresponds to FIG. 7(B).

On both ends in a width direction of the fitting protrusions 66, the rotator side abutting portions 66t which fit and abut against the angle detection rotating body 33 are formed. The rotator side abutting portions 66t are formed into arc shapes in a plan view, which are tapered toward the abutting portions against fitting trench portions 36.

On the other hand, on predetermined opposing portions of angle detection rotating body 33, which oppose each other in a diametrical direction, the fitting trench portions 36 which allows fitting of the fitting protrusions 66 are formed.

On both ends in a width direction of the fitting trench portions 36, sensor side abutting portions 36t which abut the rotator side abutting portions 66t are formed. The sensor side abutting portions 36t are formed in planar shapes.

With the above-described structure, when the fitting protrusions 66 of the torque transmitting portion 61 and the fitting trench portions 36 of the angle detection rotating body 33 fit to each other, the rotator side abutting portions 66t having arc shapes in a plan view linearly abut the sensor side abutting portions 36t having planar shapes, and the torque is transmitted from the torque transmitting portion 61 to the angle detection rotating body 33.

Accordingly, an area of the abutting portions of the rotator side abutting portions 66t and the sensor side abutting portions 36t can be made small, and a quiet and comfort running with no annoying sound can be achieved as described above.

The fitting structure of the torque transmitting portion and the angle detection rotating body according to the present invention can be formed with various embodiments other than the embodiments as described above.

Figure 12A:
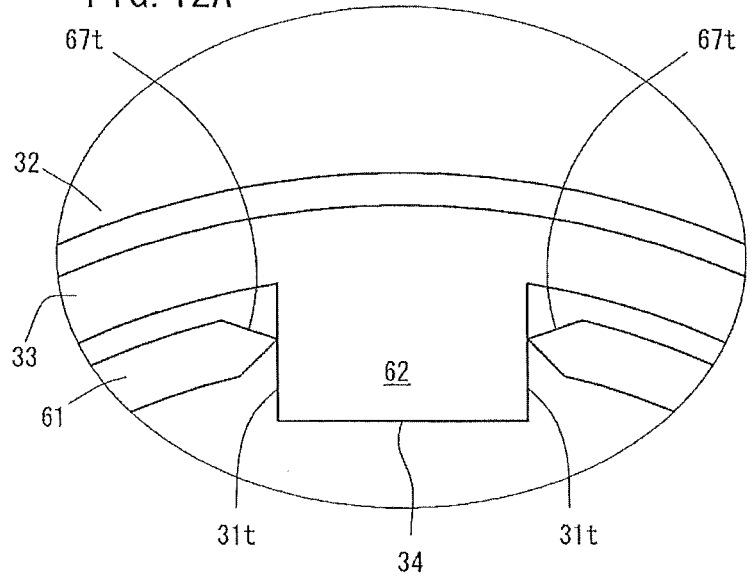
FIG. 12A A diagram explaining a fitting structure of an angle detecting rotating body and a torque transmitting portion of another embodiment.
Figure 12B:
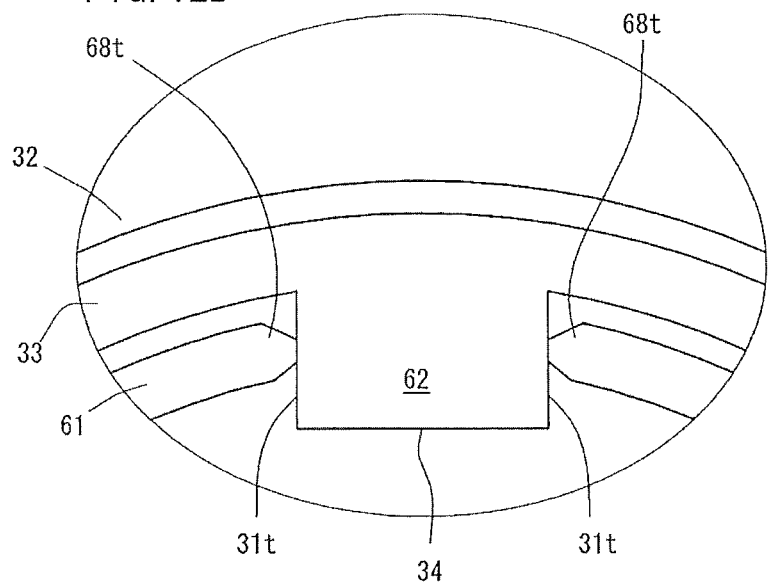
FIG. 12B A diagram explaining a fitting structure of an angle detecting rotating body and a torque transmitting portion of another embodiment.

For example, as shown in FIG. 12(A), in the structure where the fitting trench portions 62 are formed on the torque transmitting portion 61, rotator side abutting portions 67t do not have to have the arc shapes in a plan view as described above, but may be tapered shapes which protrude at sharp angles, or, as shown in FIG. 12(B), rotator side abutting portions 68t may be formed in tapered shapes which have tip portions protruding at sharp angles being flat. As long as they are tapered, other various embodiments are possible.

FIGS. 12(A) and 12(B) are diagrams which show rotator side abutting portions 66t another embodiment and neighboring portions and which correspond to FIG. 7(B).

With respect to correspondence between the structure of the present invention and the above embodiments, the rotary connector device corresponds to the steering roll connector 10. Similarly, the rotary connector unit corresponds to the cable housing 11, the retainer 41, and the rotation lock structure 51; the fitting portions correspond to the fitting trench portions 62 and the fitting protrusions 66; the fitting allowance portions correspond to the fitting protrusions 34 and the fitting trench portions 36; the fitting abutting portions correspond to the rotator side abutting portions 62t, 63t, 64t, 65t, 66t, 67t, and 68t; and the fitting allowance abutting portions correspond to the sensor side abutting portions 31t, 32t and 36t.

The present invention is not limited to the above-described embodiments but may be realized with the various embodiments.

DESCRIPTION OF THE REFERENCE NUMERALS

10 . . . Steering roll connector
12 . . . Stator
13 . . . Rotator
30 . . . Angle detection unit
31 . . . Angle detection sensor
61 . . . Torque transmitting portion
33 . . . Angle detection rotating body
62, 66 . . . Fitting trench portions
34, 36 . . . Fitting protrusions
62t, 63t, 64t, 65t, 66t, 67t, 68t . . . Rotator side abutting portions
31t, 32t, 36t . . . Sensor side abutting portions

The invention claimed is:

1. A rotary connector device, wherein:
a stator and a rotator, which rotates with respect to the stator concentrically with a steering, are formed;
a torque transmitting portion, which rotates together with the rotator and which transmits a rotation torque of the steering to an angle detection rotating body provided in an angle detection sensor for detecting a rotation angle of the steering, is formed concentrically with the angle detection rotating body;
a fitting portion for fitting to a fitting allowance portion, which is formed on at least a part of a circumferential direction of the angle detection rotating body, is formed on the torque transmitting portion;
a fitting abutting portion of the fitting portion, which fits and abuts against the fitting allowance portion, is formed in a shape tapered toward the fitting allowance portion;
the torque transmitting portion is formed into a tubular shape;
the fitting abutting portion comprises two apical end portions between which the fitting allowance portion is sandwiched, and a remaining portion; and
at least a part of each apical end portion is thicker than the remaining portion.

2. A fitting structure of a rotary connecter unit and an angle detection unit, comprising:
a rotary connector unit formed of a stator and a rotator which rotates with respect to the stator concentrically with a steering; and
an angle detection unit for detecting a rotation angle of the steering, wherein:
the angle detection unit includes an angle detection rotating body which rotates in association with a rotation of the steering and concentrically with the steering;
a torque transmitting portion which rotates together with the rotator and transmits a torque of the steering to the angle detection rotating body is formed in the rotary connector unit;
a fitting portion for fitting to the angle detection rotating body is formed in the torque transmitting portion;
a fitting allowance portion for allowing fitting to the fitting portion is formed on at least a part of a circumferential direction of the angle detection rotating body, the fitting structure of the rotating connector unit and the angle detection unit, having:
at least one of fitting abutting portion of the fitting portion, which fits and abuts the fitting allowance portion, and the fitting allowance abutting portion of the fitting allowance portion, which abuts the fitting abutting portion, being formed into a shape tapered toward the other,
the torque transmitting portion is formed into a tubular shape;
the fitting abutting portion comprises two apical end portions between which the fitting allowance portion is sandwiched, and a remaining portion; and
at least a part of each apical end portion is thicker than the remaining portion.

3. The rotary connector device according to claim 1, wherein:

the fitting portion is formed into a notched shape, which is fanned by notching at least a part of a circumferential direction of the torque transmitting portion.

\* \* \* \* \*